United States Patent
Sun

(10) Patent No.: US 10,129,409 B2
(45) Date of Patent: Nov. 13, 2018

(54) JOINT ACOUSTIC ECHO CONTROL AND ADAPTIVE ARRAY PROCESSING

(71) Applicant: Cisco Technology, Inc., San Jose, CA (US)

(72) Inventor: Haohai Sun, Nesbru (NO)

(73) Assignee: Cisco Technology, Inc., San Jose, CA (US)

( * ) Notice: Subject to any disclaimer, the term of this patent is extended or adjusted under 35 U.S.C. 154(b) by 46 days.

(21) Appl. No.: 15/357,015

(22) Filed: Nov. 21, 2016

(65) Prior Publication Data

US 2017/0171396 A1 Jun. 15, 2017

(30) Foreign Application Priority Data

Dec. 11, 2015 (GB) .................................. 1521878.7

(51) Int. Cl.
*H04M 9/08* (2006.01)
*H04B 3/23* (2006.01)
*H04R 3/00* (2006.01)

(52) U.S. Cl.
CPC ............ *H04M 9/082* (2013.01); *H04B 3/235* (2013.01); *H04R 3/005* (2013.01); *H04M 2203/509* (2013.01); *H04R 2430/20* (2013.01)

(58) Field of Classification Search
CPC ........ H04M 9/082; H04R 1/406; H04R 3/005
USPC ........ 349/406; 370/291; 379/406.01, 406.03, 379/406.14, 406.08; 381/66, 71.1, 92, 381/306, 17, 56; 455/570, 456.1; 704/200.1, 500; 84/600; 356/478; 375/340; 398/48, 49
See application file for complete search history.

(56) References Cited

U.S. PATENT DOCUMENTS

| | | | | |
|---|---|---|---|---|
| 5,027,687 A | * | 7/1991 | Iwamatsu | H04B 1/20 381/1 |
| 5,272,695 A | * | 12/1993 | Makino | H04M 9/082 370/291 |
| 5,548,642 A | | 8/1996 | Diethorn | |
| 5,970,154 A | * | 10/1999 | Chen | H04M 9/082 379/406.08 |
| 6,757,385 B1 | * | 6/2004 | Ehrenstråle | H04M 9/082 379/406.01 |
| 9,106,196 B2 | * | 8/2015 | Hetherington | H03G 3/20 |
| 9,813,811 B1 | * | 11/2017 | Sun | H04R 3/005 |
| 9,866,952 B2 | * | 1/2018 | Pandey | H04R 1/406 |

(Continued)

FOREIGN PATENT DOCUMENTS

WO 2009009568 A2 1/2009

OTHER PUBLICATIONS

Sun, et al., "Optimal Higher Order Ambisonics Encoding With Predefined Constraints," IEEE Transactions on Audio, Speech, and Language Processing, vol. 20, No. 3, Mar. 2012, pp. 742-754.

(Continued)

*Primary Examiner* — Gerald Gauthier
(74) *Attorney, Agent, or Firm* — Edell, Shapiro, & Finnan, LLC

(57) ABSTRACT

A system and method for joint acoustic echo control and adaptive array processing, comprising the decomposition of a captured sound field into N sub-sound fields, applying linear echo cancellation to each sub-sound field, selecting L sub-sound fields from the N sub-sound fields, performing L channel adaptive array processing utilizing the L selected sub-sound fields, and applying non-linear audio echo cancellation.

20 Claims, 2 Drawing Sheets

(56) References Cited

U.S. PATENT DOCUMENTS

| | | | | |
|---|---|---|---|---|
| 2002/0150256 A1* | 10/2002 | Belrose | ............... | G11B 19/025 381/17 |
| 2003/0095668 A1* | 5/2003 | Wilcock | ............... | G11B 19/025 381/56 |
| 2005/0213747 A1* | 9/2005 | Popovich | ............... | H04M 9/08 379/406.03 |
| 2006/0182268 A1* | 8/2006 | Marton | ............... | H04M 9/082 379/406.08 |
| 2008/0091415 A1* | 4/2008 | Schafer | ............... | G10L 19/0208 704/200.1 |
| 2009/0239551 A1* | 9/2009 | Woodsum | ............... | H04B 7/086 455/456.1 |
| 2011/0110526 A1* | 5/2011 | Ishibashi | ............... | H04M 9/082 381/66 |
| 2011/0178798 A1 | 7/2011 | Flaks et al. | | |
| 2012/0323583 A1* | 12/2012 | Miyasaka | ............... | H04M 9/082 704/500 |
| 2013/0194580 A1* | 8/2013 | Yuan | ............... | G01B 11/161 356/478 |
| 2014/0003635 A1* | 1/2014 | Mohammad | ............... | G10K 11/16 381/306 |
| 2014/0066134 A1* | 3/2014 | Houshuyama | ............... | H04M 9/082 455/570 |
| 2014/0079232 A1* | 3/2014 | Houshuyama | ............... | H04R 3/02 381/66 |
| 2014/0105410 A1* | 4/2014 | Zhan | ............... | G10K 11/175 381/66 |
| 2014/0192997 A1* | 7/2014 | Niu | ............... | H04R 3/005 381/92 |
| 2014/0219398 A1* | 8/2014 | Chan | ............... | H04L 1/005 375/340 |
| 2014/0255026 A1* | 9/2014 | Roorda | ............... | H04J 14/0212 398/49 |
| 2015/0003606 A1* | 1/2015 | Nemer | ............... | H04M 3/002 379/406.01 |
| 2015/0195648 A1* | 7/2015 | Helsloot | ............... | H04R 3/02 381/66 |
| 2015/0244492 A1* | 8/2015 | Lee | ............... | H04J 14/0212 398/48 |
| 2016/0066087 A1* | 3/2016 | Solbach | ............... | H04R 3/005 381/71.1 |
| 2017/0171396 A1* | 6/2017 | Sun | ............... | H04B 3/235 |

OTHER PUBLICATIONS

Yan, "Broadband Beamspace DOA Estimation: Frequency-Domain and Time-Domain Processing Approaches," Research Article, EURASIP Journal on Advances in Signal Processing, vol. 2007, Article 16907, Sep. 2006, 10 pages.

DspGuru, "FIR Filter Basics," http://dspguru.com/dsp/faqs/fir/basics, retrieved Oct. 21, 2015, 5 pages.

Lee, et al., "Subarray Beam-Space Adaptive Beamforming for a Dynamic Long Towed-Array," Science Applications International Corpfairfax VA, Dec. 2004, 6 pages.

ITU, "Digital Network Echo Cancellers," Series G: Transmission Systems and Media, Digital Systems and Networks, International telephone connections and circuits—Apparatus associated with long-distance telephone circuits, Recommendation ITU-T G.168, Apr. 2015, 152 pages.

Combined Search and Examination Report in counterpart United Kingdom Application No. GB1521878.7, dated May 25, 2016, 5 pages.

Herbordt, et al., "Joint Optimization of Acoustic Echo Cancellation and Adaptive Beamforming," Chapter 2, Topics in Acoustic Echo and Noise Control, Aug. 2006, pp. 19-50.

Sun, et al., "Robust Spherical Microphone Array Beamforming with Multi-Beam-Multi-Null Steering, and Sidelove Control," 2009 IEEE Workshop on Applications of Signal Processing to Audio and Acoustics, Oct. 2009, 4 pages.

Sun, et al., "Localization of distinct reflections in rooms using spherical microphone array eigenbeam processing," The Journal of the Acoustical Society of America 131 (4), Apr. 2012, 13 pages.

Yan, et al., "Optimal Modal Beamforming for Spherical Microphone Arrays," IEEE Transactions on Audio, Speech, and Language Processing, vol. 19, No. 2, Feb. 2011, 11 pages.

* cited by examiner

JOINT ACOUSTIC ECHO CONTROL AND ADAPTIVE ARRAY PROCESSING

PRIORITY CLAIM

This application claims priority to United Kingdom Application No. GB1521878.7, filed Dec. 11, 2015, the entirety of which is incorporated herein by reference.

TECHNICAL FIELD

The present invention relates to acoustic echo control, and more particularly the use of acoustic echo control for conference call systems.

BACKGROUND

Adaptive microphone array processing, such as adaptive beam-forming, is known for use with speech and audio signal capture systems. Typically such processing is employed for suppression of environmental interference or enhancement of a desired speech signal.

Acoustic echo controllers (AECs) are used in hands-free and full-duplex audio communication systems to cancel and suppress the acoustic echoes that originate from loudspeakers. For example, in a conference call, a speaker's reproduced voice at the far end (the listeners end) may be captured by microphones at that far end. It may be captured multiple times, as the reproduced voice scatters or diffracts off of surfaces within the room where the listener is located. In addition to these echoes, environmental interference is often present during a conference call which would ideally be removed. For example, the sound of the PC delivering the conference call, air conditioning etc. are all sounds which would preferably not be transferred to the far end. Not only would the transference of these sounds degrade the overall quality of the conference call, they would also utilize bandwidth unnecessarily.

For simultaneous suppression of both acoustic echoes from loudspeakers and environmental interference, it is necessary to combine adaptive microphone array processing, particularly adaptive beam-forming, with acoustic echo controllers.

As described below, there are a number of known techniques [1] for combining AEC with adaptive beam-forming solutions.

Using an "AEC first" technique, AEC is applied before a beam-former. This means that a system for implementing this technique will require one AEC per microphone channel. This method has several drawbacks. Firstly, the computational complexity of the system will be high where a large number of microphones are involved. Secondly, each microphone channel is capable of picking up the entire sound-field from a room. This will include all stationary and non-stationary noise/interference, room boundary reflections and room reverberations. These interferences can slow down the adaptation of an echo canceller. Furthermore, adaptive filters with many taps are required to handle the long echo tail i.e. the adaptive filter will require more computational resource in order to filter the echo tail. The large number of taps can also increase the AEC complexity. Finally, conventional echo control solutions utilize linear echo cancellation and non-linear residual echo suppression. Linear echo cancellation may delay the signals being processed, but the phase of the signal is not distorted. Whereas non-linear residual echo suppression may destroy the linearity of the system, by introducing non-linear phase delays, and therefore limit the adaptation and performance available from the adaptive beam-former.

Alternatively, a "beam-former first" approach can been used. In this method, the beam-forming [2,3] is applied before AEC. A major drawback in this method is that, due to the faster adaptation speed of beam-forming, whilst the AEC will see fast time-variant impulse response it will not be able to adapt to it in time. This results in a degradation of AEC performance.

Finally, there are known "joint optimization of AEC and adaptive beam-forming" methods where a combination of adaptation of the above methods is undertaken. However this method is not compatible with existing AEC and beam-forming solutions. Therefore new algorithms must be designed, tested, and tuned for the various user scenarios which are envisaged.

SUMMARY

Accordingly, the present invention aims to solve the above problems by providing, according to a first aspect, a teleconference system comprising: M audio inputs for receiving audio signals from M microphones, arranged in an array, wherein M>1 and the array is configured to capture a sound-field of a space; a processor configured to: decompose the sound-field into N sub-sound fields, wherein $1 < N \leq M$; apply linear audio echo cancellation to each sub-sound field; select L sub-sound fields from the N sub-sound fields; perform L channel adaptive array processing utilizing the L selected sub-sound fields; apply non-linear acoustic echo cancellation.

In this way, the step of decomposing the sound-field is performed before all other steps. Similarly, in some embodiments the step of applying non-linear acoustic echo cancellation is performed after the step of adaptive array processing.

In some embodiments, subsequent to capturing the sound field a first step is to decompose the sound-field into N sub-sound fields, wherein $1 < N \leq M$; a second step is apply linear audio echo cancellation to each sub-sound field; a third step is select L sub-sound fields from the N sub-sound fields; a fourth step is perform L channel adaptive array processing utilizing the L selected sub-sound fields; a fifth step apply non-linear acoustic echo cancellation.

This affords a number of advantages over conventional systems used to control acoustic echoes. For example, as discussed in more detail below, the use of sub-sound fields allows the linear acoustic echo control filter length for each sub-sound field to be reduced. This is because the level of interference and reverberation in any given sub-sound field will be less than that of the entire captured sound field. This reduction in filter length reduces the computational complexity of the linear acoustic echo control. Furthermore, the use of adaptive beam-forming on a number of sub-sound fields has a lower computational complexity than the use of adaptive beam-forming on the entire captured sound field. Additionally, the use of linear acoustic echo control (without non-linear acoustic echo control) before the beam-former's adaptive filters allows the beam-former's adaptive filters to work properly and effectively because there will have been no non-linear phase changes to the signal. This overcomes the adaptation issues discussed above with relation to the "AEC first" or "beam-former first" approaches. Finally, the invention is backwards compatible with existing audio processing solutions as it merely represents additional steps within a conventional audio processing solution.

In a second aspect, the invention provides a method of acoustic echo control and interference reduction comprising: providing M audio inputs for receiving audio signals from M microphones arranged in an array, wherein M>1 and the array is configured to capture a sound field of a space; providing a processor which: decomposes the sound field into N sub-sound fields, wherein 1<N≤M; apply linear audio echo cancellation to each sub-sound field; select L sub-sound fields from the N sub-sound fields; perform L channel adaptive array processing utilizing the L selected sub-sound fields; apply non-linear audio echo cancellation.

Optional features of the invention will now be set out. These are applicable singly or in any combination with any aspect of the invention.

In some embodiments the adaptive array processing may be adaptive beam-forming. This results in a lower computational complexity than performing beam-forming on the entire captured sound-field.

In similar embodiments, the L sub-sound fields are selected such that each selected sub-sound field has a different signal amplitude to the other selected sub-sound fields. In doing so, subsequent beamforming is more effective in comparison to selecting similar sub-sound fields.

In this or other embodiments, the L sub-sound fields are selected such that the selected sub-sound fields have less mutual coherence. That is to say, the L sub-sound fields are chosen such that each sub-sound field is not in-phase with any other selected sub-sound field. The degree by which the sub-sound fields are not in-phase is referred to as their coherence, and therefore they are selected so as to be less coherent. This selection results in selected sub-sounds fields which are more statistically independent, improving the efficiency of later processing steps.

In these embodiments, the adaptive beam-forming is performed by weighting and summing the L selected sub-sound fields. This allows portions of the signal not in the desired spatial region to be suppressed relative to those portions which are in the desired spatial region. In some embodiments, the weighting factors are calculated via the minimum variance distortion-less response method.

In these or different embodiments, the decomposition is performed by: representing captured sound field as a vector X of size 1×M; performing the calculation Y=X·H; wherein H is a decomposition matrix of size M×N, and Y is a sub-sound field vector of size.

Embodiments of the invention will now be described by way of example with reference to the accompanying drawings in which:

DETAILED DESCRIPTION

Figure 1:
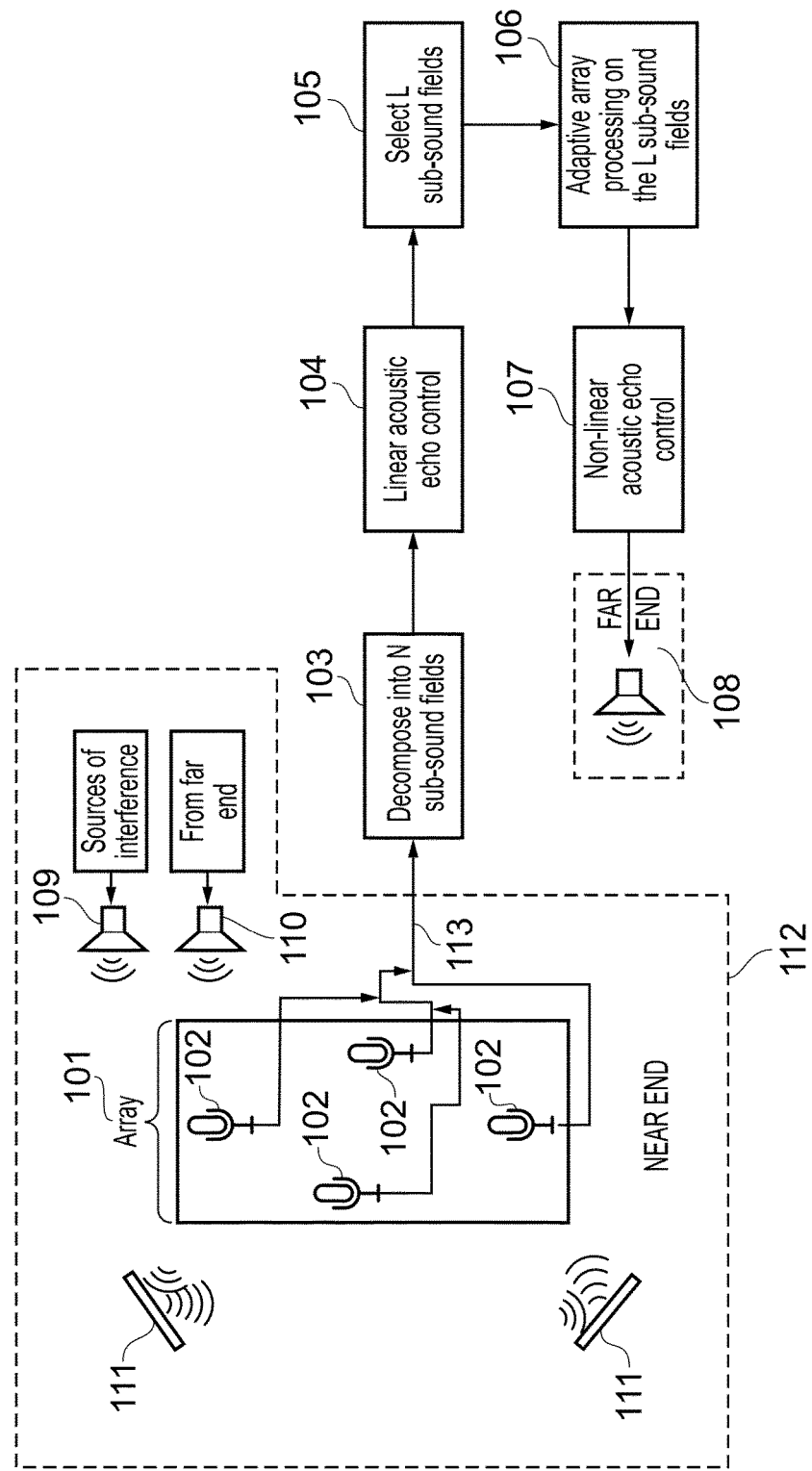
FIG. 1 is a schematic of a process flow diagram utilizing the present invention.

FIG. 1 shows a schematic of a conference system utilizing the present invention. An array 101 of microphones 102 are provided to capture the sound field 112 present in the space where the conference is to be held. The microphones 102 will capture, for example, sounds generated from a far end source 110 as well as interference 109 and echoes generated by reflecting surfaces 111. The microphones 102 provide audio signals via the audio inputs 113. This captured sound field is then decomposed 103 into N sub-sound fields by a processor (not shown) where N is greater than 1. In order to decompose the captured sound field each microphone signal is stored as an element of a vector X, as $X=\{x_1, x_2 \ldots x_M\}$. The vector X then represents the entire captured sound field, and is of size 1×M. The sub-sound field signal vector Y (of size 1×N) can then be calculated as follows:

$$Y = X \cdot H$$

where H is a decomposition matrix of size M×N.

This enables the captured sound field to be processed as a plurality of sub-sound fields. After decomposition, linear acoustic echo control (LAEC) processes are applied 104 to each of the sub-sound fields. For LAEC, an adaptive filter is used to identify and reconstruct an acoustic echo path in the room where the sound field is captured. An example of an LAEC process that could be used is described in [1]. Therefore the room's impulse response can be modelled. The output of the adaptive filter is an estimate of the echo signal, which can then be subtracted from the microphone signal thereby cancelling the acoustic echo. Therefore, a linear acoustic echo cancellation or suppression algorithm, as is known in the art, may be applied to each of the sub-sound fields individually. A particular advantage of this technique is that, by decomposing the captured sound field into N sub-sound fields is generally lower than that contained in any single microphone channel (i.e. the captured sound field). Therefore, the adaptive filter length of any given sub-sound field LAEC can be shorter than that of a conventional LAEC applied to a single microphone channel. Furthermore, as each sub sound field will generally have different directivity characteristics, the adaptive filter for each respective sub-sound field can have a different filter length. By utilizing shorter and non-equal filter lengths, the computational complexity of the respective LAEC steps can be reduced. After this linear acoustic echo control, L sub-sound fields are selected 105 utilizing pre-defined criteria (where L≤N) and adaptive array processing techniques are used 106, for example beam-forming. In beam-forming, some of the sub-sound fields are combined such that the amplitude of a signal from a desired spatial direction is protected, whilst the amplitude of the signals from a non-desired spatial direction are suppressed or degraded. This combination can be through weighting and summing the selected sub-sound fields. The weighting can be performed via the minimum variation distortion-less response method [4]. The effect of this is to help isolate a spatial portion of the sound field (which has been decomposed) from the remainder of the sound field. The pre-defined criteria, used to select the L sub-sound fields is that each of the selected sub-sound fields should have a different signal amplitude, and in some embodiments a markedly different signal amplitude e.g. having a wide spread of signal amplitudes. Additionally or alternatively, the pre-defined criteria may be used to select L sub-sound fields which lack coherence with one another i.e. each of the sub-sound fields has a different phase. This allows the beamforming to be more effective in comparison to examples where the sub-sound fields are selected to be similar. One examples of beamforming that can be used is discussed in [2,3]. Other examples of adaptive array processing can be used in addition with or as a replacement for beam-forming. For example: blind source separation, de-reverberation etc. As, up to this point, only linear processing techniques have been used a range of adaptive array processing techniques can be applied. After this step, non-linear processing algorithms may be applied 107 and the recording is transmitted to the far end 108 for reproduction. For example echo residual post-filtering. The principle of residual echo post-filtering is that, after LAEC, if the residual echo percentage in the audio channel is still high (i.e. there is still a noticeable echo present), this audio channel should be suppressed, for example by applying a lower gain, to mask the residual echo. In contrast, if the residual echo is low (i.e. the echo has been effectively suppressed), the audio channel can be amplified, for example by applying a higher or unit gain to this channel. It is also possible to statistically post-filter the audio signal, in order to reduce non-deterministic influences of the acoustic echo path. These non-deterministic influences can be caused by the time variation of room impulse response, as well as a limited adaptive filter length. In real systems, the adaptive filter length is smaller than the reverberation time.

Figure 2:
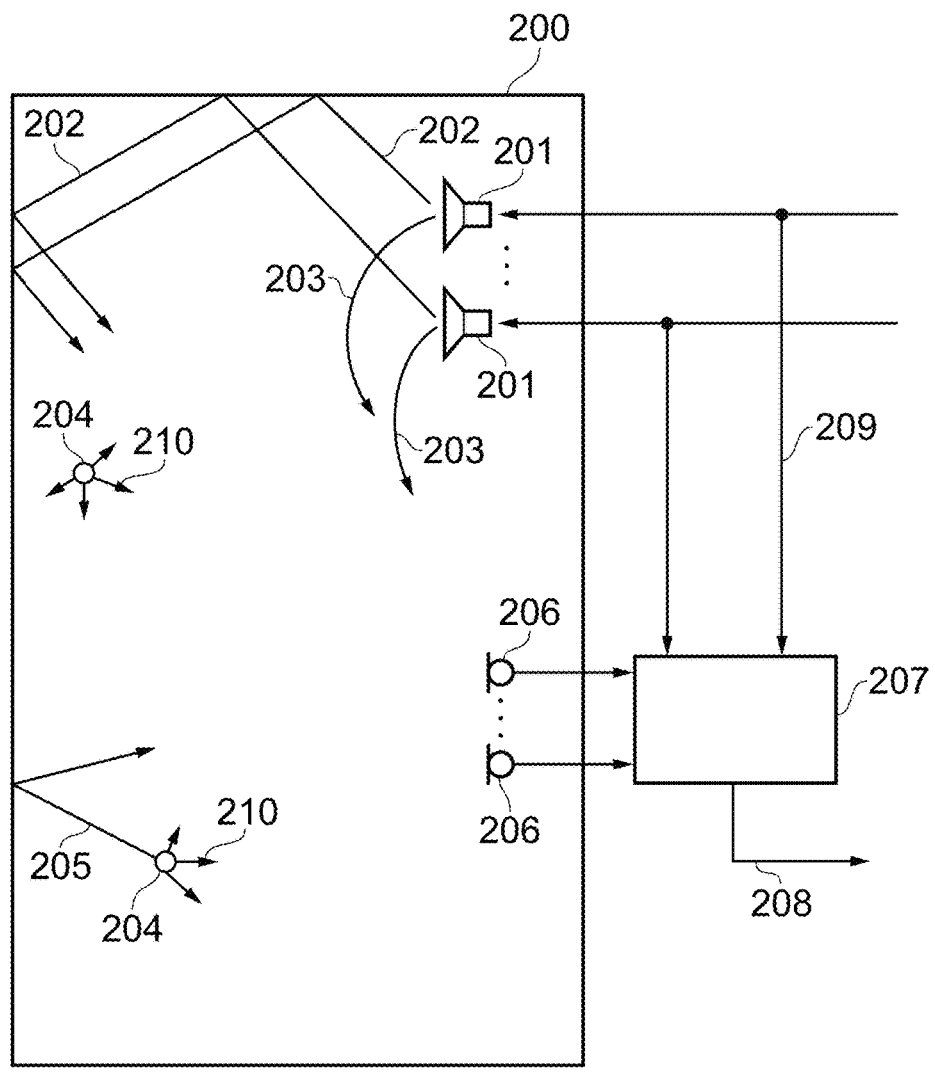
FIG. 2 is a schematic of system utilizing the present invention.

FIG. 2 illustrates a system for implementing the present invention. A room 200 contains a number of speakers 201 and microphones 206. The speakers 201 are connected 209 to a processing unit 207, as are the microphones 206. The microphones 206 are configured to capture the sound field of the room 200, and transmit the captured sound field to the processing unit 207. The microphones 206 capture sound from a number of sources, however there is a distinction between those sounds which are desired and those which are not desired. For example, user's 204 using the present invention will emit sound 210 generally towards the microphones 206. This is desired sound, as the user's 204 wish to communicate with those at a far end of the system. However the sound 210 from the users 204 may reflect from surfaces within the room 200, generating reverberation noise 205. This is undesirable because, as the reverberation noise 205 is generally delayed with relation to the user's sound 210, it can reduce the clarity of the user 204 communicating using the system. Furthermore, speaker-originating sound 203, e.g. from those at the far end of the system, may be captured by the microphones 206. This is also undesired sound, because this sound 203 can cause echoes to be transmitted to those at the far end of the system. As with the noise 210 generated by a user 204, the speaker-originating sound 203 can reflect from surfaces of the room 200, thereby generating-reflection noise 202. This is also undesirable.

The processing unit 207, connected to the microphones 206 and speakers 201, functions to minimize the transmission and reproduction of the undesired sound by way of the methods described above thereby producing an improved signal. The improved signal is then transmitted 208 to the far end of the system for reproduction.

In summary, in one form, a teleconference system is provided comprising: _M audio inputs configured to receive audio signals from M microphones arranged in an array, wherein M>1 and the array is configured to capture a sound field of a space; and a processor coupled to the M audio inputs, and configured to: decompose the sound field into N sub-sound fields, wherein $1<N\leq M$; apply linear audio echo cancellation to each sub-sound field; select L sub-sound fields from the N sub-sound fields; perform L channel adaptive array processing utilizing the L selected sub-sound fields; and apply non-linear audio echo cancellation.

In another form, a method is provided comprising: providing M audio inputs for receiving audio signals from M microphones arranged in an array, wherein M>1 and the array is configured to capture a sound field of a space; using a processor coupled to the M audio inputs: decomposing the sound field into N sub-sound fields, wherein $1<N\leq M$; applying linear audio echo cancellation to each sub-sound field; selecting L sub-sound fields from the N sub-sound fields; performing L channel adaptive array processing utilizing the L selected sub-sound fields; and applying non-linear audio echo cancellation.

In still another form, a method is provided comprising: receiving audio signals from M microphones arranged in an array that is arranged to capture a sound field of a space; obtaining M audio inputs from the M microphones; using a processor coupled to the M microphones: decomposing the sound field into N sub-sound fields, wherein $1<N\leq M$; applying linear audio echo cancellation to each sub-sound field; selecting L sub-sound fields from the N sub-sound fields; performing adaptive array processing of the L selected sub-sound fields; and applying non-linear audio echo cancellation after adaptive array processing of the L selected sub-sound fields.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A teleconference system comprising:
M audio inputs configured to receive audio signals from M microphones arranged in an array, wherein M>1 and the array is configured to capture a sound field of a space; and
a processor coupled to the M audio inputs, and configured to:
decompose the sound field into N sub-sound fields, wherein $1<N\leq M$, by representing the captured sound field as a vector X of size 1×M, and calculating Y=X·H, wherein H is a decomposition matrix of size M×N, and Y is a sub-sound field vector of size 1×N;
apply linear audio echo cancellation to each sub-sound field;
select L sub-sound fields from the N sub-sound fields;
perform L channel adaptive array processing utilizing the L selected sub-sound fields; and
apply non-linear audio echo cancellation.

2. The teleconference system of claim 1, wherein the adaptive array processing is adaptive beam-forming.

3. The teleconference system of claim 2, wherein the adaptive beam-forming is performed by weighting and summing the L selected sub-sound fields.

4. The teleconference system of claim 2, wherein the processor is configured to select the L sub-sound fields so that each sub-sound field has a different signal amplitude to the other selected sub-sound fields.

5. The teleconference system of claim 2, wherein the processor is configured to select L sub-sound fields so that selected sub-sound fields have less mutual coherence.

6. The teleconference system of claim 2, wherein the processor is configured to select the L sub-sound fields such that each selected sub-sound field has a different phase.

7. A method of acoustic echo control and interference reduction comprising:
providing M audio inputs for receiving audio signals from M microphones arranged in an array, wherein M>1 and the array is configured to capture a sound field of a space;
using a processor coupled to the M audio inputs:
decomposing the sound field into N sub-sound fields, wherein $1<N\leq M$, by:

representing the captured sound field as a vector X of size 1×M; and performing a calculation Y=X·H; wherein H is a decomposition matrix of size M×N, and Y is a sub-sound field vector of size 1×N;

applying linear audio echo cancellation to each sub-sound field;

selecting L sub-sound fields from the N sub-sound fields;

performing L channel adaptive array processing utilizing the L selected sub-sound fields; and applying non-linear audio echo cancellation.

8. The method of claim 7, wherein the adaptive array processing is adaptive beam-forming.

9. The method of claim 8, wherein the adaptive beam-forming is performed by weighting and summing the L selected sub-sound fields.

10. The method of claim 7, wherein selecting the L sub-sound fields is such that each sub-sound field has a different signal amplitude to the other selected sub-sound fields.

11. The method of claim 10, wherein the L sub-sound fields are selected so that selected sub-sound fields have less mutual coherence.

12. The method of claim 7, wherein the selecting the L sub-sound fields is such that each selected sub-sound field has a different phase.

13. The method of claim 9, wherein the weighting includes weighting by a minimum variation distortion-less response method.

14. A method comprising:

receiving audio signals from M microphones arranged in an array that is arranged to capture a sound field of a space;

obtaining M audio inputs from the M microphones;

using a processor coupled to the M microphones:

decomposing the sound field into N sub-sound fields, wherein 1<N≤M, by:

representing the captured sound field as a vector X of size 1×M; and performing a calculation Y=X·H; wherein H is a decomposition matrix of size M×N, and Y is a sub-sound field vector of size 1×N;

applying linear audio echo cancellation to each sub-sound field;

selecting L sub-sound fields from the N sub-sound fields;

performing adaptive array processing of the L selected sub-sound fields; and applying non-linear audio echo cancellation after adaptive array processing of the L selected sub-sound fields.

15. The method of claim 14, wherein the adaptive array processing is adaptive beam-forming.

16. The method of claim 14, wherein the adaptive beam-forming is performed by weighting and summing the L selected sub-sound fields.

17. The method of claim 14, wherein selecting comprises selecting the L sub-sound fields is such that each sub-sound field has a different signal amplitude to the other selected sub-sound fields.

18. The method of claim 17, wherein selecting comprises selecting the L sub-sound fields so that the selected sub-sound fields have less mutual coherence.

19. The method of claim 16, wherein the selecting comprises selecting the L sub-sound fields such that each selected sub-sound field has a different phase.

20. The method of claim 16, wherein the weighting includes weighting by a minimum variation distortion-less response method.

* * * * *